(12) United States Patent
Harischandrakar et al.

(10) Patent No.: US 8,856,132 B2
(45) Date of Patent: Oct. 7, 2014

(54) TIPS MANAGEMENT SYSTEM AND PROCESS FOR MANAGING ORGANIZATION-WIDE KNOWLEDGE TIPS

(75) Inventors: Aparna Harischandrakar, Maharashtra (IN); Ambreesh Kumar, Maharashtra (IN); Shyam Rajadhyax, Maharashtra (IN); Nikhil Gordia, Maharashtra (IN); Chetan R. Kumar, Madhya Pradesh (IN)

(73) Assignee: Infosys Limited (IN)

( * ) Notice: Subject to any disclaimer, the term of this patent is extended or adjusted under 35 U.S.C. 154(b) by 317 days.

(21) Appl. No.: 12/894,227

(22) Filed: Sep. 30, 2010

(65) Prior Publication Data
US 2011/0320456 A1 Dec. 29, 2011

(30) Foreign Application Priority Data
Jun. 24, 2010 (IN) .......................... 1783/CHE/2010

(51) Int. Cl.
*G06F 17/30* (2006.01)

(52) U.S. Cl.
CPC ................................ *G06F 17/30707* (2013.01)
USPC ........................................................ 707/740

(58) Field of Classification Search
CPC .......................... G06F 17/30289; G06N 5/02
USPC ........................................................ 707/740
See application file for complete search history.

(56) References Cited

U.S. PATENT DOCUMENTS

| 7,668,789 B1* | 2/2010 | Forman et al. ................... 706/20 |
| 7,991,764 B2* | 8/2011 | Rathod ........................ 707/713 |
| 2002/0123983 A1* | 9/2002 | Riley et al. ....................... 707/1 |
| 2006/0073812 A1* | 4/2006 | Punaganti Venkata et al. ........................... 455/412.1 |
| 2006/0277091 A1* | 12/2006 | Kochikar et al. ................ 705/10 |
| 2009/0077124 A1* | 3/2009 | Spivack et al. ............. 707/103 Y |
| 2009/0311992 A1* | 12/2009 | Jagetiya ..................... 455/412.1 |
| 2010/0005093 A1* | 1/2010 | Heumann et al. ................. 707/5 |
| 2010/0223157 A1* | 9/2010 | Kalsi ............................. 707/802 |
| 2011/0010367 A1* | 1/2011 | Jockish et al. ................ 707/733 |

* cited by examiner

*Primary Examiner* — Rehana Perveen
*Assistant Examiner* — Tiffany Thuy Bui
(74) *Attorney, Agent, or Firm* — Cantor Colburn LLP (57) ABSTRACT

The invention provides a method, a system, and a computer program product for managing and distributing knowledge tips in an organization. A member of the organization submits a knowledge tip and one or more data points corresponding to the knowledge tip in a Tips Management System (TiMS). The member associates the knowledge tip with at least one pre-defined category. A member selects knowledge tips by defining a criterion in TiMS. The member selects category(ies) and/or projects(s) and provides delivery parameters for planning the delivery of knowledge tips to the at least one member. The TiMS delivers the selected knowledge tips to the each member as per the delivery parameters.

41 Claims, 5 Drawing Sheets

TIPS MANAGEMENT SYSTEM AND PROCESS FOR MANAGING ORGANIZATION-WIDE KNOWLEDGE TIPS

FIELD OF THE INVENTION

The present invention relates to managing knowledge within an organization. More specifically, it relates to gathering, storing, scheduling, and delivering knowledge tips within an organization.

BACKGROUND

In today's competitive world, every organization thrives to provide best output to consumers, users, or clients. To achieve this, organizations take various measures that include managing their internal knowledge. Effective management of the internal knowledge is a key factor in any organization's success because of various advantages associated with it. For example, effective knowledge management helps in improving the knowledge of employees or members in the organization. This knowledge improvement enables members to provide improved quality and quick output. Quick output increases the overall productivity in the organization and increases the profit. Similarly, better quality output helps the organization to provide better services or products as compared with the competitors. Better services and products in turn increase the organization's sales and profit margins.

Traditionally, members of an organization help in knowledge management by sharing valuable documents and knowledge tips with other members through e-mails and meetings. However, not all members make the effort of sending an e-mail or organizing a meeting. Moreover, a member who is willing to share the information will mostly share the information with people he/she knows only. As a result, the knowledge is distributed to limited members only. For instance, consider a scenario where a member is working on a long-duration project in a team of 10 members. The organization houses 1,000 employees and has offices in three locations. In such a scenario, the member will mostly share knowledge with the 10 members in his/her project and may not know who else in the organization might find the knowledge useful. To take care of these limitations, many organizations assign a team to manage knowledge within the organization. The members of the team are given the responsibility of collecting knowledge from members within the organization, storing the collected knowledge, and distributing the knowledge within the organization. Most of the tasks undertaken by the members of the team are executed manually. This knowledge management practice has a number of limitations such as it requires high manual effort, it is prone to manual errors, it is limited to a particular team/some members, and tasks are not completed because of team member's unavailability and limited access for organization members to the knowledge.

In light of the above-mentioned limitations, organizations are innovating and embracing new solutions for knowledge management. One such solution involves maintaining a central repository and allowing members to submit knowledge in the central repository and access knowledge from this repository. Accessing the repository usually includes searching relevant documents based on keywords and manually filtering the search results to identify relevant documents. This solution also has a number of limitations associated with it. For example, on one hand, the solution does not ensure that all existing knowledge is captured and entered in the knowledge repository. A member who has valuable knowledge may not submit the knowledge with the repository. On the other hand, the solution does not ensure that an enthusiastic member does not overload the repository with not-so-relevant information which other members might not find relevant. Also, distribution of the captured knowledge is limited because a member may not know what all knowledge is available in the repository. Also, keywords based searching and manually filtering results are effort intensive steps because of which members may shy away from accessing information from the repository.

In light of the above discussion, there is a need for a method, a system, and a computer program product for effectively managing knowledge within an organization.

SUMMARY

The invention provides a method, a system, and a computer program product for managing and distributing knowledge tips in an organization that comprises one or more members. A member of the organization submits a knowledge tip and one or more data points corresponding to the knowledge tip in a system, hereinafter termed as Tips Management System (TiMS). The data points include the identity information of the member providing the knowledge tip, the project with which the knowledge tip is associated, the date and time at which the knowledge tip is submitted, and a rating. The member associates the knowledge tip with at least one predefined category. A member schedules the TiMS to share a plurality of knowledge tips with at least one member of the organization. The member schedules the TiMS by first defining a criterion for selecting the plurality of knowledge tips from all the knowledge tips available in the TiMS. On selecting the knowledge tips, the member provides delivery parameters for planning the delivery of the plurality of knowledge tips to the at least one member. The delivery parameters include the pattern of recurrence for sending; the range of date for the recurrent sending; and the identity, contact information, and media preference of each member receiving the plurality of knowledge tips. The TiMS delivers the plurality of knowledge tips to each member as per the delivery parameters.

The method, the system, and the computer program product described above have a number of advantages. The TiMS provides effective management of organization-wide knowledge in terms of collecting, organizing, scheduling, and sharing knowledge tips within the organization. The TiMS allows an organization to effectively manage the valuable knowledge inside the organization and eliminate the dependency on certain members, which were traditionally assigned to handle knowledge management. The elimination of dependency reduces the dependency issues such as loss of valuable knowledge because of manual errors, stalling activities due to unavailability of members because of leave or exit from the organization. Also, the TiMS provides a convenient way to members to receive knowledge tips at a convenient time at a preferred medium. TiMS allows members to submit a knowledge tip and view knowledge tips without much effort, which was the case in traditional knowledge management practices.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DESCRIPTION OF THE DRAWINGS

The invention describes a system, a method, and a computer program product for managing the knowledge in an organization in the form of knowledge tips. A knowledge tip is defined as a relevant piece of information or knowledge gathered during executing a project. A knowledge tip may be a new finding, a piece of information given by an expert of a domain, and the like. Two examples of knowledge tips are given below.

Example 1

Alt+Tab Replacement Power Toy

Those who use the Alt+Tab key combination to switch between open windows on a desktop, encounter times when one window cannot be distinguished from the other due to more than one instance of the same program open.

Microsoft got aware of this draw-back after releasing the XP operating system and subsequently released a "Power Toy" to resolve this issue. The Power Toy resolves this issue by replacing the program icons with actual screenshots of open windows. This way a user can identify exactly which window to switch to. This helps when navigating between several SAP windows at one time.

Here are the instructions to install:
  Copy URL to browser:
    http://download.microsoft.com/download/whistler/Install/2/VVXP/EN-US/TaskswitchPowertoy-Setup.exe
  Choose "Run" from pop-up dialog box
  Choose "Run" a second time, this will kick-off the installation of the Power Toy—Once you get the "Installation Complete" dialog, the toy is successfully installed. No need to reboot your PC.

Example 2

Autoboxing and Unboxing Feature of JAVA-5

Java 5 supports automatic conversion of primitive types (int, float, double, etc.) to their object equivalents (Integer, Float, Double, etc.) in assignments, methods, and constructor invocations. This conversion is known as autoboxing.

Java 5 also supports automatic unboxing, where wrapper types are automatically converted into their primitive equivalents if needed for assignments, methods, or constructor invocations. For example,

```
int inative = 0;
  inative = new Integer(5); // auto-unboxing
Integer intObject = 5; // autoboxing Before J2SE 5.0, we could not put
primitive values like int, long, float, double, char, etc., into collections as
``` they are not objects. Collections can hold object references, so we were required to use wrapper classes. Consider the following example: if we want to store an int "a" into vector "vt", we have to use wrapper class. And if we want to get element stored at position "0" of vector "vt", we again have to do casting.

```
int a = 10;
  Vector vt = new Vector( );
// to add int value in vector using Integer wrapper class
  vt.add(new Integer(a));
//to retrieve data from vector and store it in primitive data type
  int n = ((Integer)vt.elementAt(0)).intValue( );
```

J2SE 5.0 has made this easy. If we want to do the same in Java 5, the code will be like the following:

```
int a = 10;
Vector <integer> vt = new Vector <integer> ( );
vt.add(a);
int n = vt.elementAt(0);         // </integer></integer>
```

Before J2SE 5.0, Java had primitive data types with wrappers around them, so we had to convert from one type to another manually

```
int a = 12;
Integer b = Integer.valueOf(a);
int c = b.intValue( );
```

J2SE 1.5 autoboxing/unboxing eliminates the effort of manual conversion between primitives and wrappers. Of course, the compiler creates code to implicitly create objects for us.

```
int a = 12;
Integer b = a;
int c = b;
```

Auto-Boxing works also in comparisons (==, <, >, etc.). For instance, you can compare int with Integer.

```
int a = 10;
Integer b = 10;
System.out.println(a==b);
Output:
true
```

Note:
Few things to remember while using autoboxing/unboxing are that the Java compiler actually manages type conversions for us. So, boxing and unboxing too many values can make garbage collector generate an exception. Hence, it is not an advisable to use autoboxing and unboxing for scientific computing, or other performance-sensitive numerical code as it will affect the performance to a good extent. Using primitive types will serve the purpose better here.

A person skilled in the art will appreciate that the example tips comprise valuable pieces of information. Sharing of knowledge tips helps members of an organization not only to enhance their knowledge, but to save time and effort in complete tasks.

Figure 1:
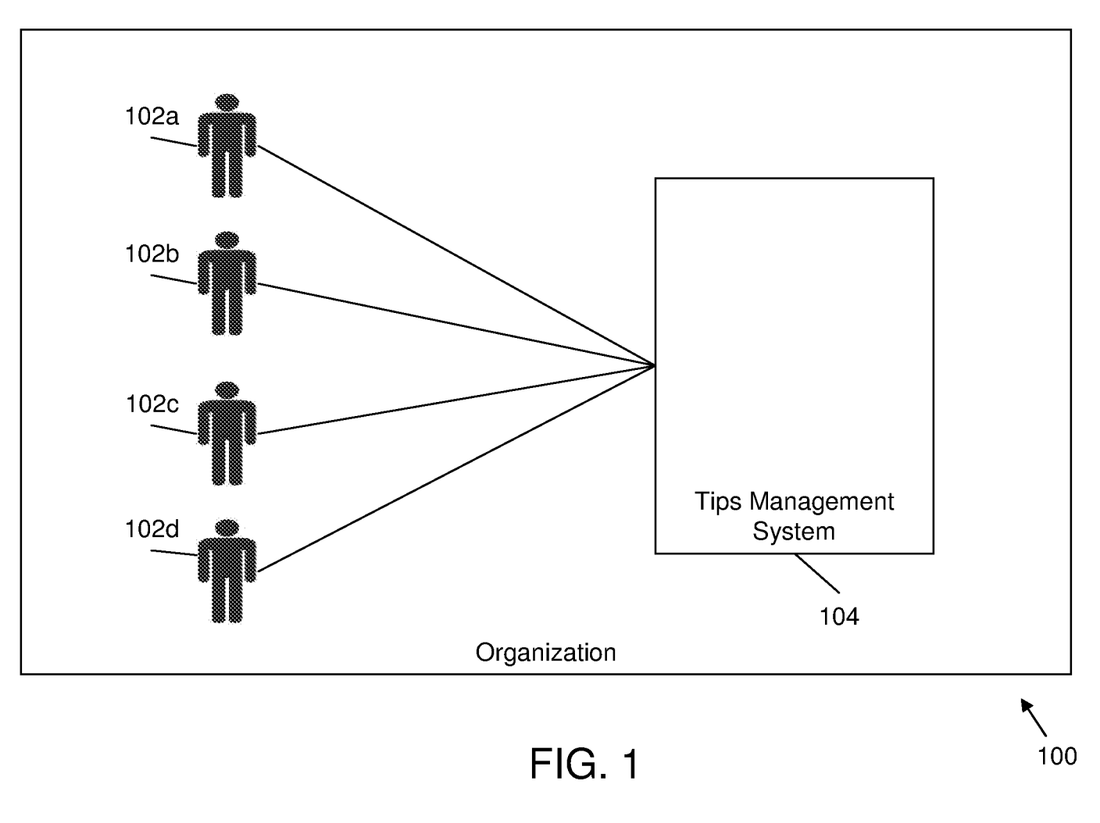
FIG. 1 illustrates an environment in which various embodiments of the invention may be practiced.

FIG. 1 illustrates an environment in which various embodiments of the invention may be practiced. An organization 100 is any kind of organization working in any field that has a plurality of employees or members. Examples of the organization are, but not limited to, a research firm working in the field of pharmaceuticals, a company providing IT services, a company providing finance related consultancy, and a marketing company. Organization 100 has a plurality of members 102a-d (hereinafter referred to as members 102) and a Tips Management System 104. Tips Management System 104 allows members 102 to submit a knowledge tip and share it with all or some of members 102 in the organization. Tips Management System 104 is hereinafter referred to as TiMS 104.

Figure 2:
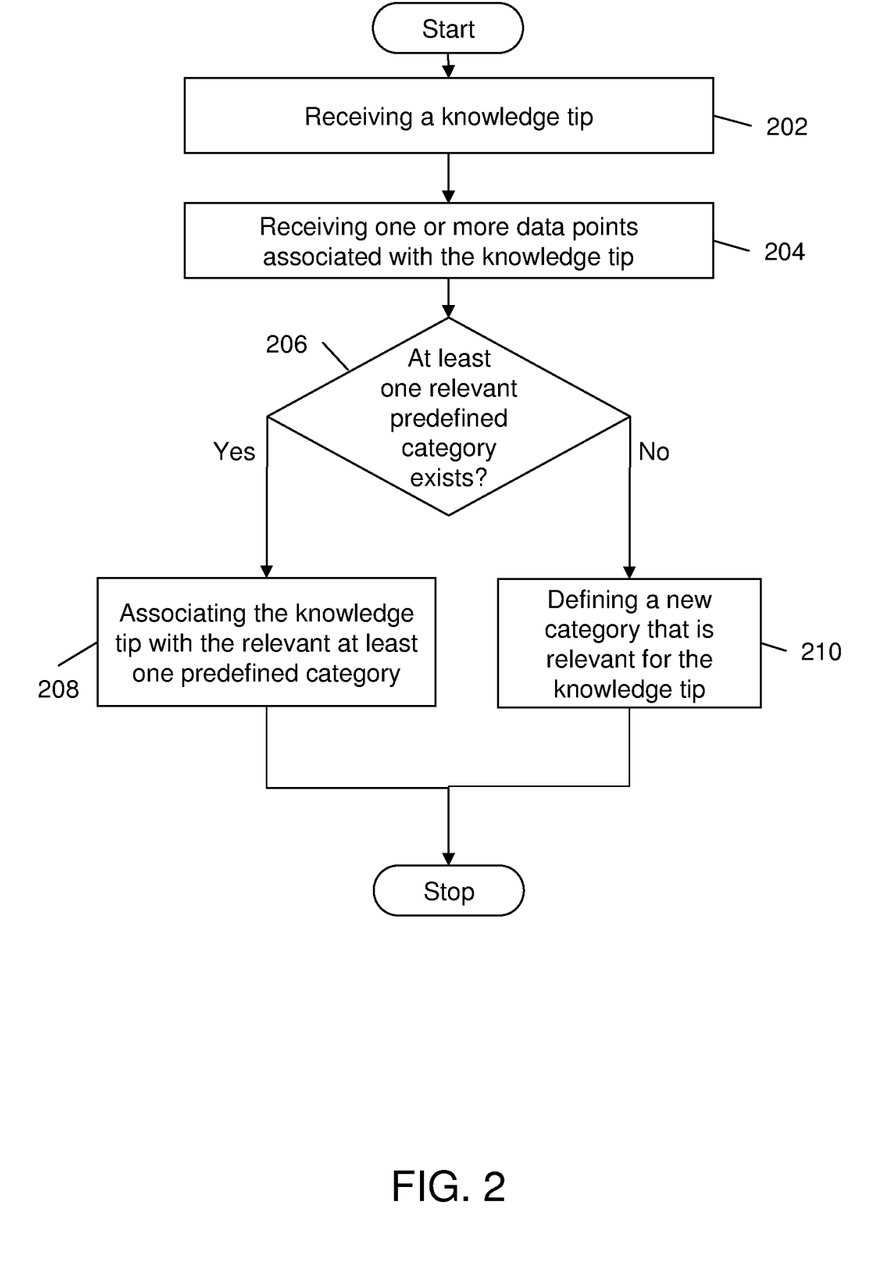
FIG. 2 is a flow chart of a method for populating the Tips Management System with a knowledge tip.

FIG. 2 is a flowchart of a method for populating TiMS 104 with a knowledge tip. At step 202, Tips Management System 104 receives a knowledge tip from member 102 of the organization. In an embodiment of the invention, not all members 102 of the organization are authorized by Tips Management System 104 to submit a knowledge tip. A limited number of members of a particular project are authorized. The authorized members 102 thus act as the knowledge managers to submit a knowledge tip on the behalf of the entire project team. This option of authorizing a limited number of members 102 is utilized so as to manage the number and quality of knowledge tips submitted to TiMS 104. At step 204, TiMS 104 receives one or more data points associated with the submitted knowledge tip. These data points relate to the identity information of the member providing the knowledge tip, the project with which the knowledge tip is associated, the date and time at which the knowledge tip is received by TiMS 104, and a rating. In an embodiment of the present invention, each member 102 of the organization is given login credentials for accessing TiMS 104. From the log-in credentials, TiMS 104 identifies member 102 who submits a tip and associates the identity information, and date and time of submitting the knowledge tip with the submitted knowledge tip. In another embodiment of the present invention, TiMS 104 prompts member 102 to enter the identity, and date and time information. For each project in the organization, TiMS 104 stores the identity of team members associated with the project. Thus, once the identity of a member is established, TiMS 104 associates the knowledge tip submitted by the member with the project with which the member associates. In another embodiment of the present invention, TiMS prompts member 102 to enter the project information with which the knowledge tip associates. TiMS 104 calculates a rating for the knowledge tip based on predefined parameters that are set by the organization or a business unit within the organization to which the knowledge tip relates. In an embodiment, rating is a measure of different members' feedback on the knowledge tip. Rating can be scaled based on the relevance of the knowledge tip. Each member 102 who accesses a knowledge tip is prompted to provide feedback on a predefined scale to gauge the relevance of the knowledge tip. For example, a knowledge tip can be rated on a scale of 1 to 5 based on its usefulness to members 102, as follows:

| Rating | Description |
| --- | --- |
| 1 | Not Useful |
| 2 | Use in Future |
| 3 | Useful for Personal Development |
| 4 | Fairly Useful |
| 5 | Very Useful |

A person skilled in the art will appreciate that similar other data points can be received by TiMS 104, even though only identity, project, rating, and date and time information has been discussed.

At 206, member 102 checks predefined categories present in TiMS 104 to check if at least one of the categories can be associated with the submitted knowledge tip. Categories are defined to be based on technology, domain, and quality. Some examples of technology based categories are Java 2 Platform-Enterprise Edition (J2EE), Oracle 10i, SQL, and Red Hat. In an embodiment of the present invention, sub-categories are defined within a category. For example, for the J2EE category, Enterprise JavaBeans (EJB), Struts and Spring Framework can be some of the sub-categories. Some examples of domain based categories are telecom sector, automobiles sector and communication sector. Example sub-categories for communication sector can be communication channel, communication type and communication process. Quality based categories are defined based on factors that help in improving the quality in a system by following different processes at the organization level. Some examples of quality based categories are Capability Maturity Model Integration (CMMI), ISO 9000, Configuration Management, Risk Management and Project Management. The process moves to 208 in case member 102 identifies at least one predefined category that can be associated with the submitted knowledge tip. At 208, member 102 associates the identified at least predefined category with the submitted knowledge tip. In case member 102 cannot identify any predefined category that can be associated with the knowledge tip, the process moves from 206 to 210. At step 210, member 102 defines and submits a new category in TiMS 104 and associates the submitted knowledge tip with this new defined category. Any member 102 subsequently submitting a new knowledge tip will see this new defined category with other predefined categories. In another embodiment of the present invention, member 102 defines a new category and submits it with TiMS 104. Member 102 also associates the submitted knowledge tip with this new category. A new category addition request goes to an administrator of TiMS 104. On approval from the administrator, the category is added in TiMS 104, and the knowledge tip is associated with the category. In case the administrator does not approve the new category, neither the new category nor the knowledge tip (if only associated with the new category) is added to TiMS 104.

In an embodiment of the present invention, TiMS 104 provides uploading multiple knowledge tips together from a file, such as Microsoft Excel file.

Figure 3:
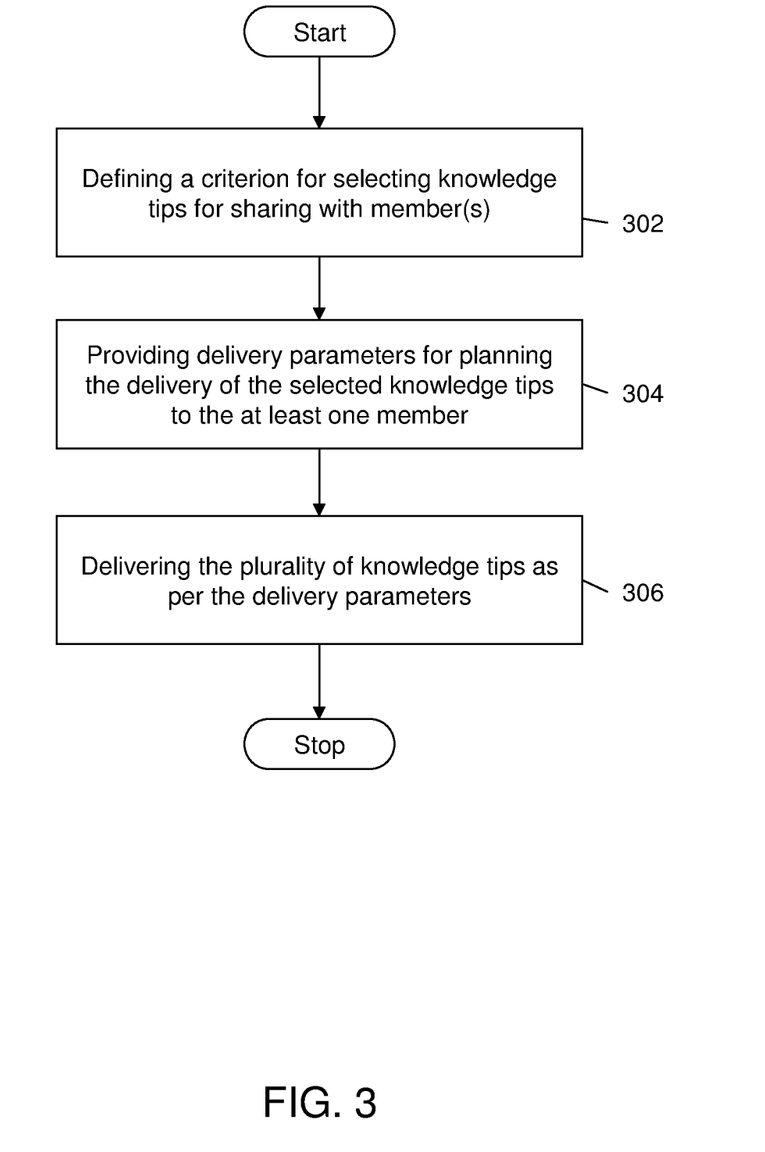
FIG. 3 is a flowchart of a method for scheduling the tips repository to share knowledge tips with member(s)

FIG. 3 is a flowchart of a method for scheduling TiMS 104 to share knowledge tips with member(s) in the organization. At 302, member 102 defines criteria for selecting knowledge tips from the knowledge tips present in TiMS 104. Examples of search criterion include, but are not limited to, the following:

Content: This search option allows member 102 to specify keyword(s) for searching in the content of knowledge tips.

Category: This search option is provided to search for knowledge tips based on the category. Member 102 can specify one or more categories for searching knowledge tips.

Author: This search option is provided so that the user can search for knowledge tips submitted by a particular member. In this search criterion, member 102 has the option to specify the complete name of the particular member or use the wild card search options. Multiple member names can also be specified for the search.

Specific project(s): This field is provided to search for knowledge tips based on the project. Member 102 can search for knowledge tips belonging to one or more projects simultaneously. This field is also provided to search for knowledge tips that are submitted by the members of a project.

Date of submission: This search option allows member 102 to search for knowledge tips submitted within a specific date range. Member 102 can specify the date range— from and to (or either of them)—and identify the knowledge tips submitted within the date range.

Knowledge tips with specific rating: This search option allows member 102 to search for knowledge tips with specific ratings.

It is obvious to a person skilled in the art that a combination of the above-mentioned selection criteria can be used to search for knowledge tips. A person skilled in the art will also appreciate that any other selection criteria can be defined based on the knowledge tip content or the associated datapoints.

At step 304, member 102 provides delivery parameters to TiMS 104 for planning the delivery of some or all knowledge tips identified at step 302 to at least one member of the organization. In an embodiment of the present invention, the knowledge tips belonging to category(ies) and/or project(s) can be scheduled for delivery. In other words, member 102 selects relevant category(ies) and/or project(s) using the knowledge tips identified at step 302 and schedules the knowledge tips belonging to the category(ies) and/or project(s) for delivery. The delivery parameters include, but are not limited to, the pattern of recurrence for sending, the range of date for the recurrent sending, and the identity, contact information and media preference of each member receiving the selected knowledge tips. An example of each delivery parameter is given below for illustration:

The pattern of recurrence for sending: one knowledge tip every week on Monday at 8 AM;

The range of date for the recurrent sending: 1 Jun. 2010 to 1 Dec. 2010; and

Identity, contact information, and media preference of each member.

| | Identity | Media | Contact |
|---|---|---|---|
| Name | Employee/Member ID | Preference | Information |
| Thomas Peterson | 1234 | Email | Tom@xyz.com |
| John Smith | 3214 | Cell phone | 12345678 |

At step 306, TiMS 104 delivers knowledge tips as per the delivery parameters defined at step 304. Considering the above mentioned example, Thomas Peterson and John Smith will receive one knowledge tip, belonging to the selected category or project, at 8 AM on every Monday at their email address and cell phone respectively, during 1 June to 1 Dec. 2010.

TiMS 104 also allows member 102 to manage his/her scheduled knowledge tips. These schedules include all schedules in which member 102 is mentioned as a recipient of one or more knowledge tips. Member 102, on logging to TiMS 104, is given an option to view the knowledge tips that are scheduled to be delivered to him/her. Member 102 is presented the details of each schedule. The details of the schedule include the selected category and/or project, delivery parameters, and the author of the schedule. Member 102 is allowed to delete the presented one or more schedules for him/her. In case member 102 is not the author of the schedule, member 102 can get his/her details deleted from the schedule without affecting the schedule for other members. In an embodiment of the present invention, member 102 sends a request to a knowledge manager of his/her project to remove him/her from the schedule. The knowledge manager then acts on the request and deletes the member's details from the schedule. As mentioned earlier in the description of FIG. 2, a limited number of members of a project are designated as knowledge managers and are authorized to add knowledge tips, and add and modify details in TiMS 104 for the project.

Figure 4:
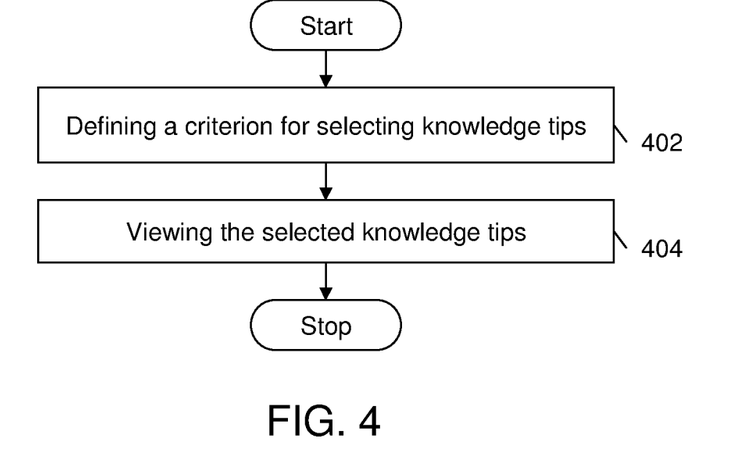
FIG. 4 is a flowchart of a method for viewing knowledge tips in the Tips Management System.

FIG. 4 is a flowchart of a method for viewing knowledge tips from TiMS 104. At 402, member 102 defines criteria to select knowledge tips from all that are present in TiMS 104. The details of the selection criteria are same as that discussed in 302 of FIG. 3. At 404, member 102 views the selected knowledge tips directly from TiMS 104. In an embodiment of the present invention, the selected knowledge tips are presented to member 102 as a list. For each knowledge tip, the title, associated category, submission date, and author's name are presented along with a link to access the content of knowledge tip. Member 102 selects knowledge tip(s) from this list and uses the associated link to view the content of the selected knowledge tip(s).

Figure 5:
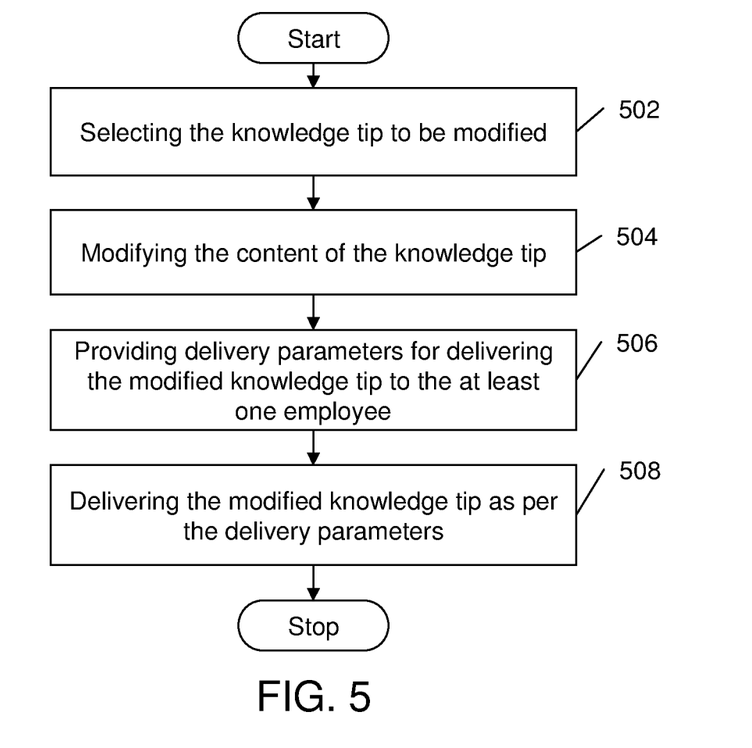
FIG. 5 is a flowchart of a method for modifying a knowledge tip existing in the Tips Management System.

FIG. 5 is a flowchart of a method for modifying a knowledge tip existing in TiMS 104. At 502, member 102 selects the knowledge tip that needs to be modified using the criteria for selection, as described in detail in 302 of FIG. 3. At 504, the knowledge tip content is modified by member 102. At 506, member 102 provides delivery parameters for delivery of the modified knowledge tip to at least one other member 102 in the organization. At 508, the modified knowledge tip is delivered as per the delivery parameters. The modified knowledge tip is delivered to the at least one other member 102 to ensure that the modification in the knowledge tip is known to all members 102 for whom the knowledge tip is relevant. Only the author of the knowledge tip or and an administrator is allowed to modify the knowledge tip. Here, the author of the knowledge tip is member 102 who submitted the knowledge tip with TiMS 104.

TiMS 104 also allows for deletion of a knowledge tip. Only an administrator and the author of a knowledge tip are allowed to delete the knowledge tip from TiMS 104. Here, the author of the knowledge tip is member 102 who submitted the knowledge tip with TiMS 104. A knowledge tip can be deleted only if it is not already scheduled for delivery. In other words, a knowledge tip which is scheduled for delivery cannot be deleted.

TiMS 104 also allows for deletion of a category. Only an administrator and the author of a category are allowed to delete the category from TiMS 104. Here, the author of the category is member 102 who submitted the category with TiMS 104. A category can be deleted only if there is no knowledge tip associated with this category in TiMS 104 and there is no project associated with the category. TiMS maintains a record of each project in the organization and its associated category. A project is associated to a category when the project members' details are entered in TiMS 104, by an administrator.

Figure 6:
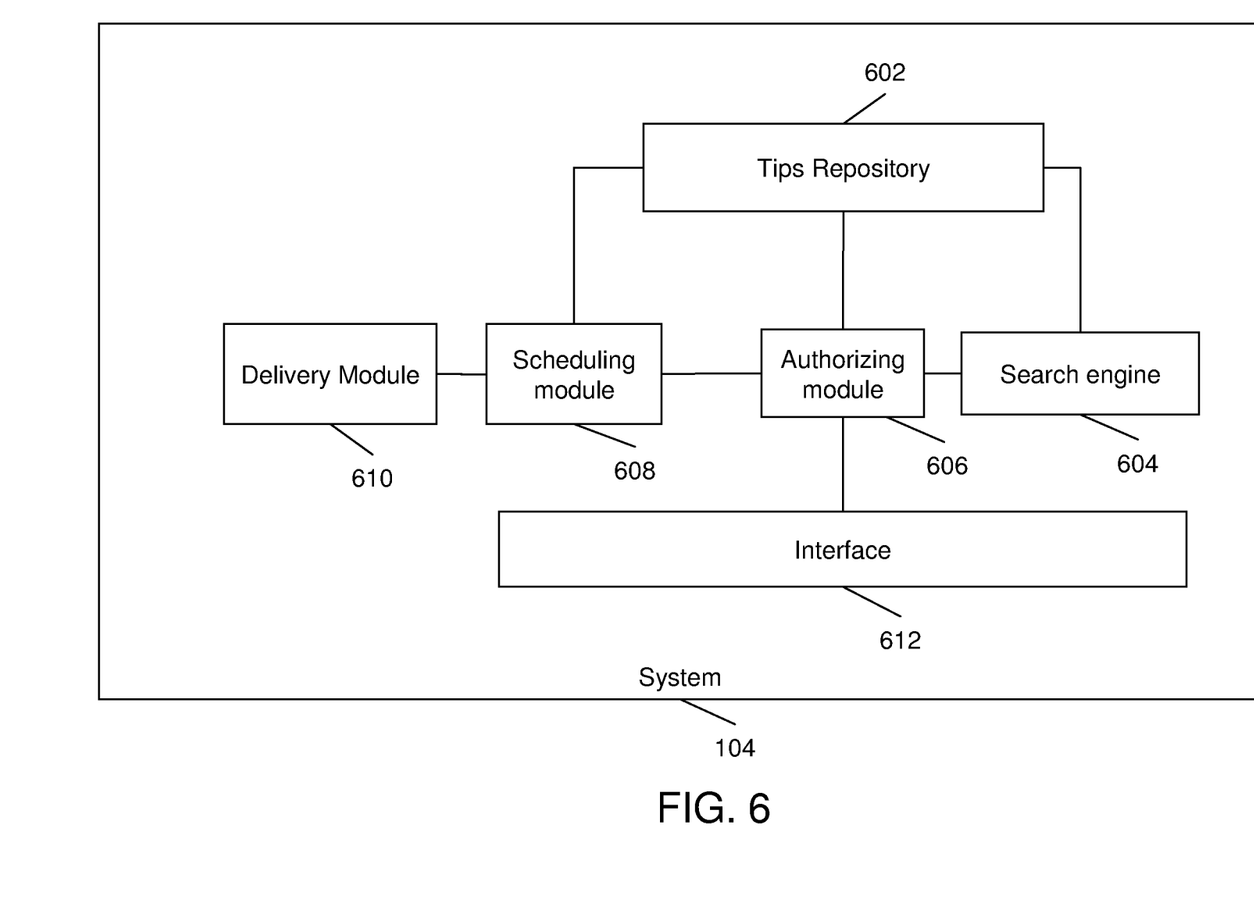
FIG. 6 is a block diagram of the system for managing organization-wide knowledge tips.

FIG. 6 is a block diagram of TiMS 104 that comprises an a Tips Repository 602, a Search Engine 604, an Authorizing Module 606, a Scheduling Module 608, a Delivery Module 610, and an Interface 612. Tips Repository 602 stores knowledge tips provided by members 102, and the data points associated with each knowledge tip. Tips Repository 602 also stores other relevant information provided by members 102, such as delivery parameters associated. Member 102 provides a knowledge tip and other relevant information to Tips Repository 602 using Interface 612.

Interface 612 is configured to interact with Tips Repository 602 for a number of tasks, including submitting a knowledge tip, viewing a knowledge tip, defining search criteria for selecting knowledge tips, scheduling the delivery of a knowledge tip, modifying a knowledge tip, and counting the number of times each knowledge tips is viewed/delivered for rating the knowledge tip. Interface 612 also allows members 102 to provide feedback on each knowledge tip and rating the knowledge tip based on the feedback. Interface 612 also allows an administrator to monitor TiMS 104. In an embodiment, Interface 612 allows an administrator to enter information relating to project(s) in the organization and the identity of the members associated with each entered project. Interface 612 also allows an administrator to later add or delete members for a project. In an embodiment, Interface 612 allows an administrator to check and to approve a newly submitted knowledge tip. Once the administrator approves the knowledge tip, it is stored in Tips Repository 602.

Authorizing Module 606 authorizes members 102 to perform various tasks at TiMS 104. For example, to manage the quality of knowledge tip inputs, not every member 102 in an organization is allowed to enter knowledge tips in TiMS 104. In such a situation, a limited number of members working on a project are allowed to input knowledge tips on the behalf of the entire project team. Authorizing Module 606 keeps a record of access rights associated with each member and allows members to interact with TiMS 104 according to these rights. Thus, a member 102 who does not have the rights to input a knowledge tip will not be allowed by Authorizing Module 606 to do so. Authorization Module 606 also keeps a check on who is allowed to do other activities in TiMS such as modify a knowledge tip and modify schedules. In an embodiment of the present invention, only the author of the knowledge tip and an administrator are authorized to modify the knowledge tip, and only knowledge managers and administrators are authorized to modify schedules.

Search Engine 604 conducts search in Tips Repository 602 according to the search criteria defined by a member 102 to select knowledge tips that satisfy the search criteria. The search criteria is provided by a member 102 using Interface 612.

Scheduling Module 608 schedules knowledge tips for delivery according to the delivery parameters provided by member 102. For example, a member defines the delivery parameters as sending a knowledge tip belonging to a particular category to three specific members on a daily basis for next two months. Search Engine 604 conducts search using the search criteria and identifies 65 knowledge tips in the mentioned category. Scheduling Module 608 schedules one of the 65 selected knowledge tips to be delivered to the three specified members so that a different tip is sent every day for two months.

Delivery Module 610 delivers the knowledge tips scheduled for delivery by Scheduling Module 608 to different members depending on their media preference as mentioned in the delivery parameters. The media preference information of a member also includes the associated contact information of the member. Consider an example in which knowledge tips are scheduled for delivery to three specific members. The first member wants to receive the knowledge tips on mobile phone at number 12345, the second member on email at xyz@abc.com, and the third member on RSS feed at the member's RSS feed link. Delivery Module 610 delivers the knowledge tips as per the media preferences—email, email on mobile phone, RSS feed, Instant Messenger, SMS on mobile phone, etc.

TiMS 104 is managed by at least one administrator. In an embodiment of the present invention, an administrator is assigned for each project or category. Any knowledge tip submitted is associated with the project or category is checked by the administrator. The knowledge tip is added in TiMS 104 only after the administrator approves it. In another embodiment of the present invention, an administrator is assigned for each category or project and randomly selects some of the newly submitted knowledge tips associated with the category or project. The selected knowledge tips are added in TiMS 104 only after the administrator approves it. The remaining newly submitted knowledge tips, which were not selected by the administrator for checking, are added to TiMS 104. The newly submitted knowledge tips remain available to the administrator for checking for a fixed number of days. If the administrator does not select a knowledge tip for checking of within the fixed number of days, the knowledge tip is automatically added to TiMS 104. Checking by an administrator is enabled so that incorrect, duplicate, or junk knowledge tips can be deleted.

As mentioned earlier, TiMS 104 maintains a rating associated with each tip based on parameters predefined by the organization or a business unit within the organization. Similarly to a rating associated with a knowledge tip, TiMS 104 maintains a score for each knowledge tip. Score for a knowledge tip is given based on factors such as number of times a knowledge tip has been viewed by members 102. The rating and score associated with a knowledge tip help member 102 to gauge the relevance or usefulness of a knowledge tip without going through the knowledge tip content. This is particularly helpful when member 102 conducts a search and TiMS 104 returns a list of many knowledge tips as the search result. Member 102 may browse the listed knowledge tips and choose knowledge tips for viewing based on the knowledge tip title, rating, and/or score. This helps member 102 to choose a relevant knowledge tip without investing time and effort in viewing the content of each knowledge tip.

The method, the system, and the computer program product described above have a number of advantages. TiMS 104 provides effective management of organization-wide knowledge in terms of collecting, organizing, scheduling, and sharing of knowledge tips within the organization. The TiMS 104 allows an organization to effectively manage the valuable knowledge inside the organization and eliminate the dependency on certain members, which were traditionally assigned to handle knowledge management. The elimination of dependency reduces the dependency issues such as loss of valuable knowledge because of manual errors, stalling activities due to unavailability of members because of leave or exit from the organization. Also, the TiMS 104 provides a convenient way to members to receive knowledge tips at a convenient time at a preferred medium. TiMS allows members to submit a knowledge tip and view knowledge tips without much effort, which was the case in traditional knowledge management practices.

TiMS 104 is a Java-based application with Oracle 10g as a back end. The application can be installed on Tomcat and developed using Eclipse as the integrated development environment (IDE). The authentication and authorization can be implemented using the network credentials already implemented in an organization. The application can be deployed in a single instance for a group or extended to the organization. Solutions such as Short Message Peer-to-peer Protocol (SMPP) API and Kannel are used to interact with mobile phones. A database such as Oracle and SQL server is to store knowledge tips, data points, schedules and employee to project mapping and project to category mapping.

TiMS 104 as described in the present invention or any of its components may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method for the present invention.

The computer system comprises a computer, an input device, a display unit, and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive and an optical disk drive. The storage device can also be other similar means for loading computer programs or other instructions into the computer system. The computer system also includes a communication unit, which enables the computer to connect to other databases and the Internet through an Input/Output (I/O) interface. The communication unit also enables the transfer and reception of data from other databases. The communication unit may include a modem, an Ethernet card, or any similar device which enable the computer system to connect to databases and networks such as Local Area Network (LAN), Metropolitan Area Network (MAN), Wide Area Network (WAN), and the Internet. The computer system facilitates inputs from a user through an input device, accessible to the system through an I/O interface.

The computer system executes a set of instructions that are stored in one or more storage elements to process the input data. The storage elements may also hold data or other information as desired. The storage element may be in the form of an information source or a physical memory element present in the processing machine.

The present invention may also be embodied in a computer program product for managing knowledge tips in an organization. The computer program product includes a computer-usable medium having a set program instructions comprising a program code for managing knowledge tips in an organization. The set of instructions may include various commands that instruct the processing machine to perform specific tasks such as the steps that constitute the method for the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing, or a request made by another processing machine.

While the preferred embodiments of the invention have been illustrated and described, it will be clear that the invention is not limit to these embodiments only. Numerous modifications, changes, variations, substitutions, and equivalents will be apparent to those skilled in the art, without departing from the spirit and scope of the invention, as described in the claims.

What is claimed is:

1. A method for managing and distributing knowledge tips in an organization, the organization comprising one or more members, the method comprising:
   a. receiving at a tips management system, a knowledge tip transmitted over a communication network by a first member of the organization for distribution by the tips management system to one or more members of the organization, wherein the knowledge tip is associated with at least one predefined category;
   b. receiving at the tips management system, one or more data points corresponding to the knowledge tip, wherein the one or more data points comprise descriptive information corresponding to the knowledge tip;
   c. storing the received knowledge tip and corresponding one or more data points in a tips repository comprising a database;
   d. configuring the tips repository for sharing a subset of knowledge tips stored therein with at least one member of the one or more members, wherein the configuring comprises:
      i. receiving from a second member of the organization, a criterion for selecting a subset of knowledge tips from among the knowledge tips stored in the tips repository,
      the criterion received from the second member enabling selection of the subset of knowledge tips such that at least one of the knowledge tips within the selected subset has been transmitted to the tips management system by the first member,
      wherein the subset of knowledge tips is selected for delivery to an intended set of recipients within the organization,
      and wherein the intended set of recipients are identified by the second member such that said intended set of recipients includes at least one member of the organization other than the first member and the second member;
      ii. based on the received criterion, selecting the subset of knowledge tips from among the knowledge tips stored in the tips repository; and
      iii. receiving from the second member, delivery parameters, wherein the delivery parameters control transmission of the subset of knowledge tips from the tips repository to the intended set of recipients;
   and
   e. delivery of the subset of knowledge tips from the tips repository to the intended set of recipients over a communication network, in accordance with the delivery parameters, wherein at least steps (a), (b) and (c) or at least step (d) is implemented by a processor and performed at one instance of time.

2. The method of claim 1 wherein the first member is authorized to provide the knowledge tip to the tips repository.

3. The method of claim 1, wherein the one of more data points comprise one or more of identity information of the first member, a project with which the knowledge tip is associated, date and time at which the knowledge tip is received by the tips repository and a rating.

4. The method of claim 3, wherein the rating is determined based on feedback from one or more members viewing the knowledge tip.

5. The method of claim 3, wherein the rating is determined based on a number of times the knowledge tip is viewed.

6. The method of claim 1, wherein the criterion for selecting is based on least one of content, the one or more data points and the category of the plurality of knowledge tips existing in the tips repository.

7. The method of claim 1, wherein the one or more delivery parameters comprise at least one of a pattern of recurrence for sending, the range of dates for recurrent sending, and the identity, contact information and media preference of the at least one member.

8. The method of claim 1, further comprising the step of modifying the one or more delivery parameters.

9. The method of claim 1 further comprising viewing at least one knowledge tip by selecting the at least one knowledge tip based on at least one of content, one or more data points and category of the plurality knowledge tips existing in the tips repository.

10. The method of claim 1 wherein receiving the knowledge tip in the tips repository further comprises:
   a. creating a new category in the tips repository if a required category does not exist among a plurality of predefined categories in the tips repository; and
   b. storing the knowledge tip to the new category.

11. The method of claim 10 further comprising modifying an existing category in the tips repository, wherein an author of the category is allowed to modify the tip category, and wherein the author is a member of the organization responsible for creating the category.

12. The method of claim 10 further comprising deleting an existing category from the tips repository, wherein an author of the category or an administrator are allowed to delete the category if there are no tips within the category and no projects are associated with the category, wherein the author is a member of the organization responsible for creating the category.

13. The method of claim 10 further comprising modifying content of an existing knowledge tip in the tips repository, wherein an author of the knowledge tip is allowed to modify content of the knowledge tip, and wherein the author is a member of the organization responsible for providing the existing knowledge tip to the tips repository.

14. The method of claim 13 further comprising sending the modified knowledge tip to at least one member of the organization other than the first member, by specifying the at least one member's identity, media preference and contact information in the tips repository.

15. The method of claim 10 further comprising deleting an existing knowledge tip in the tips repository, wherein an author of the knowledge tip or an administrator are allowed to delete the knowledge tip if the knowledge tip is not scheduled to be shared.

16. The method of claim 1 further comprising monitoring of the method by an administrator.

17. A system for managing and distributing knowledge tips in an organization, the organization comprising one or more members, the system comprising:
   a. a tips repository configured for storing:
      i. a knowledge tip received from a first member of the organization for distribution by the system to one or more members of the organization, wherein the knowledge tip is associated with at least one predefined category; and
      ii. one or more data points corresponding to the knowledge tip, wherein the one or more data points comprise descriptive information corresponding to the knowledge tip;
   b. a processor implemented interface configured for allowing members of the organization to interact with the tips repository;
   c. a processor implemented search engine configured for:
      i. receiving from a second member of the organization, a criterion for selecting a subset of knowledge tips from among the knowledge tips stored in the tips repository,
      the criterion received from the second member enabling selection of the subset of knowledge tips such that at least one of the knowledge tips within the selected subset has been transmitted to the tips management system by the first member,
      wherein the subset of knowledge tips is selected for delivery to an intended set of recipients within the organization,
      and wherein the intended set of recipients are identified by the second member such that said intended set of recipients includes at least one member of the organization other than the first member and the second member;
      ii. based on the received criterion selectins the subset of knowledge ties from among the knowledge tips stored in the tips repository; and
      iii. receiving from the second member, delivery parameters, wherein the delivery parameters control transmission of the subset of knowledge tips from the tips repository to the intended set of recipients;
   d. a processor implemented scheduling module configured for scheduling delivery of the selected at least one knowledge tip to the intended set of recipients using the interface, wherein transmission of the subset of knowledge tips is controlled by delivery parameters received from the second member; and
   e. a processor implemented delivery module configured for delivering the selected subset of knowledge tips from the tips repository to the intended set of recipients based on the delivery parameters.

18. The system of claim 17 further comprising an authorizing module configured for defining rights for at least one of the one or more members of the organization to interact with the tips repository.

19. The system of claim 17 wherein the data points stored in the tips repository comprises identity information of the member providing each knowledge tip, a project to which each knowledge tip is associated, and date and time at which each knowledge tip is received by the tips repository.

20. The system of claim 17 wherein the interface is further configured for defining a search criterion for selecting the at least onesubset of knowledge tips.

21. The system of claim 17 wherein the interface is further configured for viewing the subset of knowledge tips.

22. The system of claim 21 wherein the interface is further configured for counting the number of times each of the plurality of knowledge tips within the tips repository is viewed or delivered, for rating each knowledge tip.

23. The system of claim 17 wherein the interface is further configured for defining at least one delivery parameter for delivering of the selected subset of knowledge tips, wherein the at least one delivery parameter comprises one or more of pattern of recurrence for sending, range of date for recurrent sending and identity, contact information and media preference of the corresponding member of the organization.

24. The system of claim 17 wherein the interface is further configured for allowing one or more members of the organization to provide feedback for rating one or more of the plurality of knowledge tips.

25. The system of claim 17 wherein the interface is further configured for monitoring of the system by an administrator.

26. A computer program product for use with a computer, the computer program product comprising a non-transitory computer usable medium having a computer readable program code embodied therein for managing and distributing knowledge tips in an organization, the organization comprising one or more members, the computer readable program code comprising:
   a. program instructions for receiving a knowledge tip transmitted over a communication network by a first member of the organization for distribution by a tips management system to one or more members of the organization, wherein the knowledge tip is associated with at least one predefined category;
   b. program instructions for receiving at the tips management system, one or more data points corresponding to the knowledge tip, wherein the one or more data points comprise descriptive information corresponding to the knowledge tip;

c. program instructions for storing the received knowledge tip and corresponding one or more data points in a tips repository comprising a database;

d. program instructions for configuring the tips repository for sharing a subset of knowledge tips stored within the tips repository, with at least one member of the one or more members, wherein the configuring comprises:

i. receiving from a second member of the organization, a criterion for selecting a subset of knowledge tips from among the knowledge tips stored in the tips repository, the criterion received from the second member enabling selection of the subset of knowledge tips such that at least one of the knowledge tips within the selected subset has been transmitted to the tips management system by the first member, wherein the subset of knowledge tips is selected for delivery to an intended set of recipients within the organization, and wherein the intended set of recipients are identified by the second member such that said intended set of recipients includes at least one member of the organization other than the first member and the second member;

ii. based on the received criterion, selecting the subset of knowledge tips from among the knowledge tips stored in the tips repository, and iii. receiving from the second member, delivery parameters, wherein the delivery parameters control transmission of the subset of knowledge tips from the tips repository to intended set of recipients;
and e. program instructions for delivering the subset of knowledge tips from the repository to the intended set of recipients over a communication network, in accordance with the delivery parameters.

27. The computer program product of claim 26 further comprising program instructions authorizing the first member to provide the knowledge tip to the tips repository.

28. The computer program product of claim 26, wherein the one of more data points comprise one or more of identity information of the first member, a project to which the knowledge tip is associated, date and time at which the knowledge tip is received by the tips repository and a rating.

29. The computer program product of claim 28 further comprising program instructions for determining the rating based on feedback from one or more members viewing the knowledge tip.

30. The computer program product of claim 28 further comprising program instructions for determining the rating based on a number of times the knowledge tip is viewed.

31. The computer program product of claim 26, wherein the criterion for selecting is based on least one of content, the one or more data points and the category of the plurality of knowledge tips existing in the tips repository.

32. The computer program product of claim 26, wherein the one or more delivery parameters comprise at least one of a pattern of recurrence for sending, range of dates for recurrent sending, and identity, contact information and media preference of the at least one member.

33. The computer program product of claim 26 further comprising program instructions for modifying the one or more delivery parameters.

34. The computer program product of claim 26 further comprising program instructions for viewing at least one knowledge tip by selecting the at least one knowledge tip based on at least one of content, one or more data points and category of the plurality knowledge tips existing in the tips repository.

35. The computer program product of claim 26, wherein the program instructions for performing receiving the knowledge tip in the tips repository comprises:

a. a program instructions for creating a new category in the tips repository if a required category is not existing among a the plurality of predefined categories in the tips repository; and b. program instructions for storing the knowledge tip to the new category.

36. The computer program product of claim 35 further comprising program instructions for modifying an existing category in the tips repository, wherein an author of the category is allowed to modify the tip category, and wherein the author is a member of the organization responsible for creating the category.

37. The computer program product of claim 35 further comprising program instructions for deleting an existing category from the tips repository, wherein an author of the category or an administrator are allowed to delete the category if there are no tips within the category and no projects are associated with the category, wherein the author is a member of the organization responsible for creating the category.

38. The computer program product of claim 35 further comprising a program instruction means for modifying content of an existing knowledge tip in the tips repository, wherein an author of the knowledge tip is allowed to modify content of the knowledge tip, and wherein the author is a member of the organization responsible for providing the existing knowledge tip to the tips repository.

39. The computer program product of claim 38 further comprising program instructions for sending the modified knowledge tip to at least one member of the organization other than the first member, by specifying the at least one member's identity, media preference and contact information in the tips repository.

40. The computer program product of claim 35 further comprising program instructions for deleting an existing knowledge tip in the tips repository, wherein an author of the knowledge tip or an administrator are allowed to delete the knowledge tip if the knowledge tip is not scheduled to be shared.

41. The computer program product of claim 26 further comprising program instructions for monitoring of the computer program product by an administrator.

* * * * *